WILLIAM J. BURNETT.
Culinary Vessel.

No. 125,538. Patented April 9, 1872.

Witnesses.
C. H. Poole.
John R. Young

Inventor,
Wm. J. Burnett, by
Dindle and Ray, his
Attys.

UNITED STATES PATENT OFFICE.

WILLIAM JAMES BURNETT, OF CAIRO, ILLINOIS.

IMPROVEMENT IN CULINARY VESSELS.

Specification forming part of Letters Patent No. 125,538, dated April 9, 1872.

*To all whom it may concern:*

Be it known that I, WM. J. BURNETT, of Cairo, in the county of Alexander and in the State of Illinois, have invented certain new and useful Improvements in Cooking Utensils; and do hereby declare that the following is a full, clear, and exact description thereof, reference being had to the accompanying drawing making a part of this specification, in which—

Figure 1:
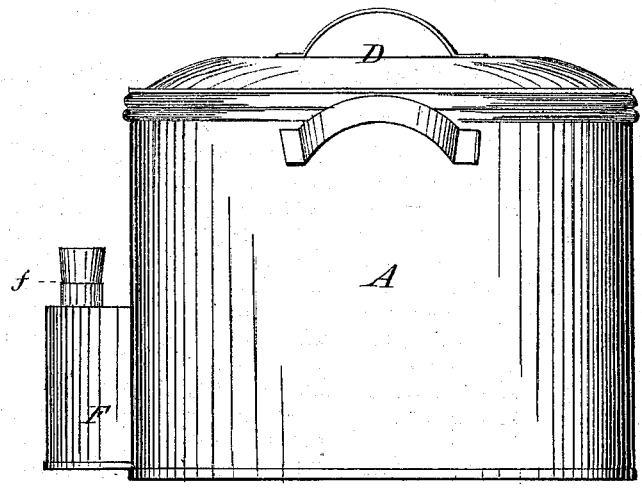
Figure 2:
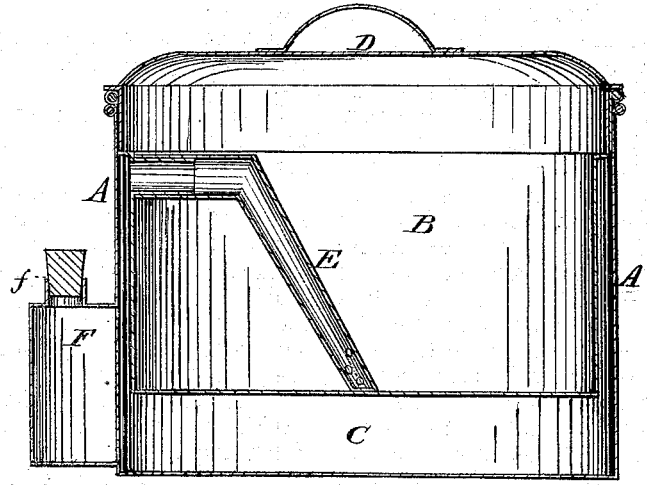

Figure 1 is a side elevation of my device, and Fig. 2 is a vertical central section of the same.

Letters of like name and kind refer to like parts in each of the figures.

The object of my invention is the production of a utensil in which food may be cooked by steam in a more economical manner than has heretofore been practicable; and, to this end, it consists, principally, in the arrangement of a steam-pipe within the food-receptacle, substantially as and for the purpose hereinafter specified. It consists, further, in the device, as a whole, substantially as and for the purpose hereinafter shown.

In the annexed drawing, A represents an outer and B an inner vessel, joined together at their upper edges, and having such relative dimensions as to leave between the sides and bottoms a space, C. The inner vessel B is inclosed at its upper side, when desired, by means of a cover, D, which fits closely so as to substantially cut off communication between the interior of said vessel and the outer air, while communication between said interior and the space C is effected by means of a pipe, E, which extends inward through the wall of said vessel, and then downward and inward, with its perforated end at or near the center of the bottom of the same. An offset, F, secured upon the side, at and above the bottom of the vessel A, and provided at its upper end with an opening, *f*, completes the device, the operation of which is as follows:

The space C is filled with water to or near the upper end of the offset F. The food to be cooked is placed within the vessel B and inclosed by means of the cover D. The opening *f* is closely filled with a cork, and the utensil placed upon a stove, or in some suitable way the water is caused to boil. The steam given off by the boiling water passes through the pipe E into the lower part of the inner vessel, where, escaping, it passes upward through and cooks the food contained therein.

By this arrangement of parts it will be seen that the steam is first caused to circulate around and heat the sides of the inner vessel, after which it escapes at the bottom and center of the food, from whence, spreading outward and upward, said steam penetrates the whole mass and speedily and thoroughly produces the desired result, which result is obtained with the expenditure of far less steam, and, consequently, heat, than would be possible by any of the ordinary means commonly employed for this purpose.

Having thus fully set forth the nature and merits of my invention, what I claim as new is—

1. The arrangement, within the vessel B, of the steam-pipe E, substantially as and for the purpose specified.

2. The hereinbefore-described cooking utensil, consisting of the outer and inner vessels A and B, respectively, connected together so as to form the space C, the cover D inclosing said inner vessel, the steam-pipe E and the offset F provided with the opening *f*, when said parts are combined substantially as and for the purpose shown.

In testimony that I claim the foregoing I have hereunto set my hand this 28th day of February, 1872.

WILLIAM JAMES BURNETT.

Witnesses:
 BAILEY S. HARRELL,
 CHRISTIAN ANTHES.